Patented July 18, 1933

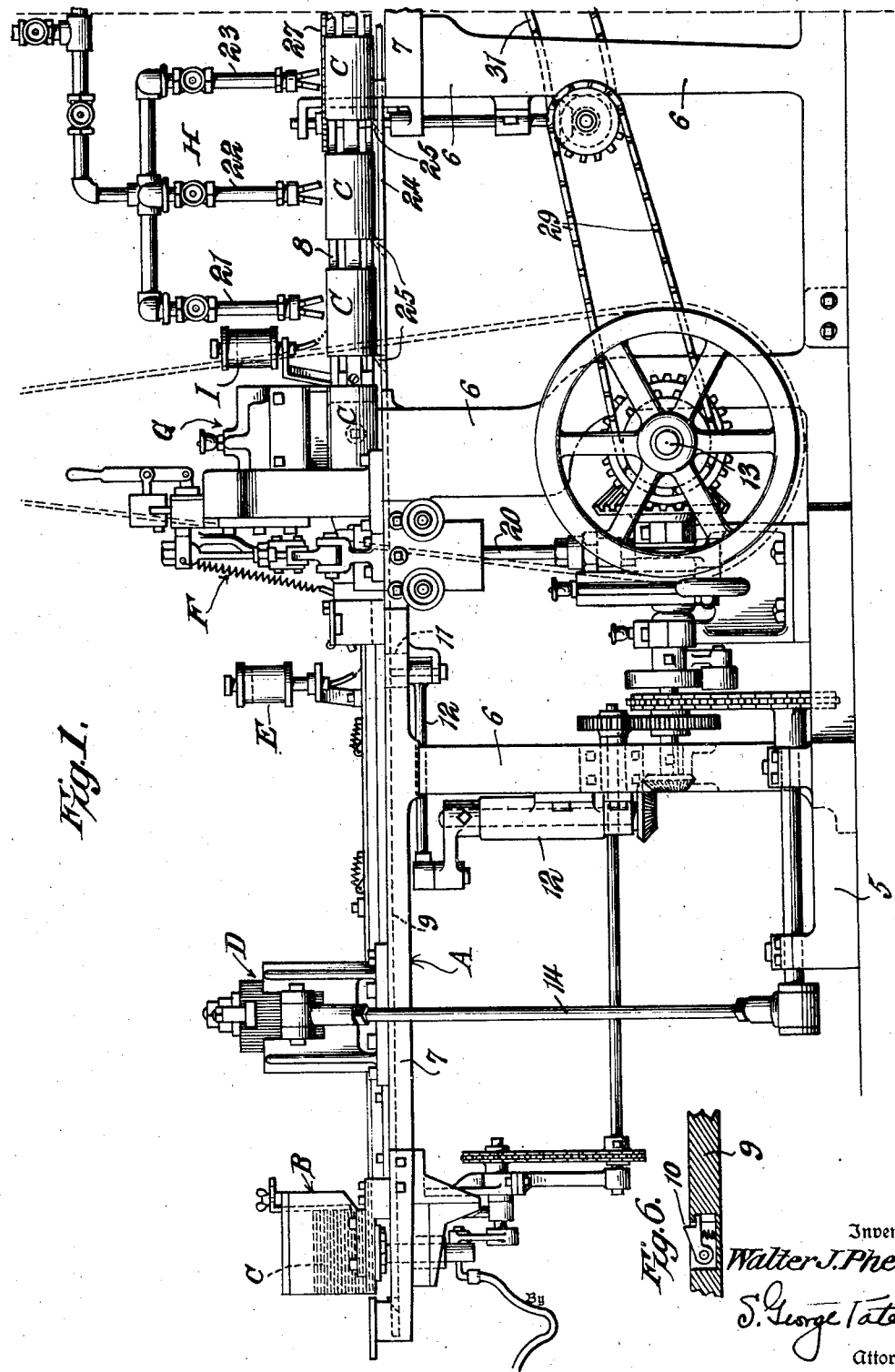

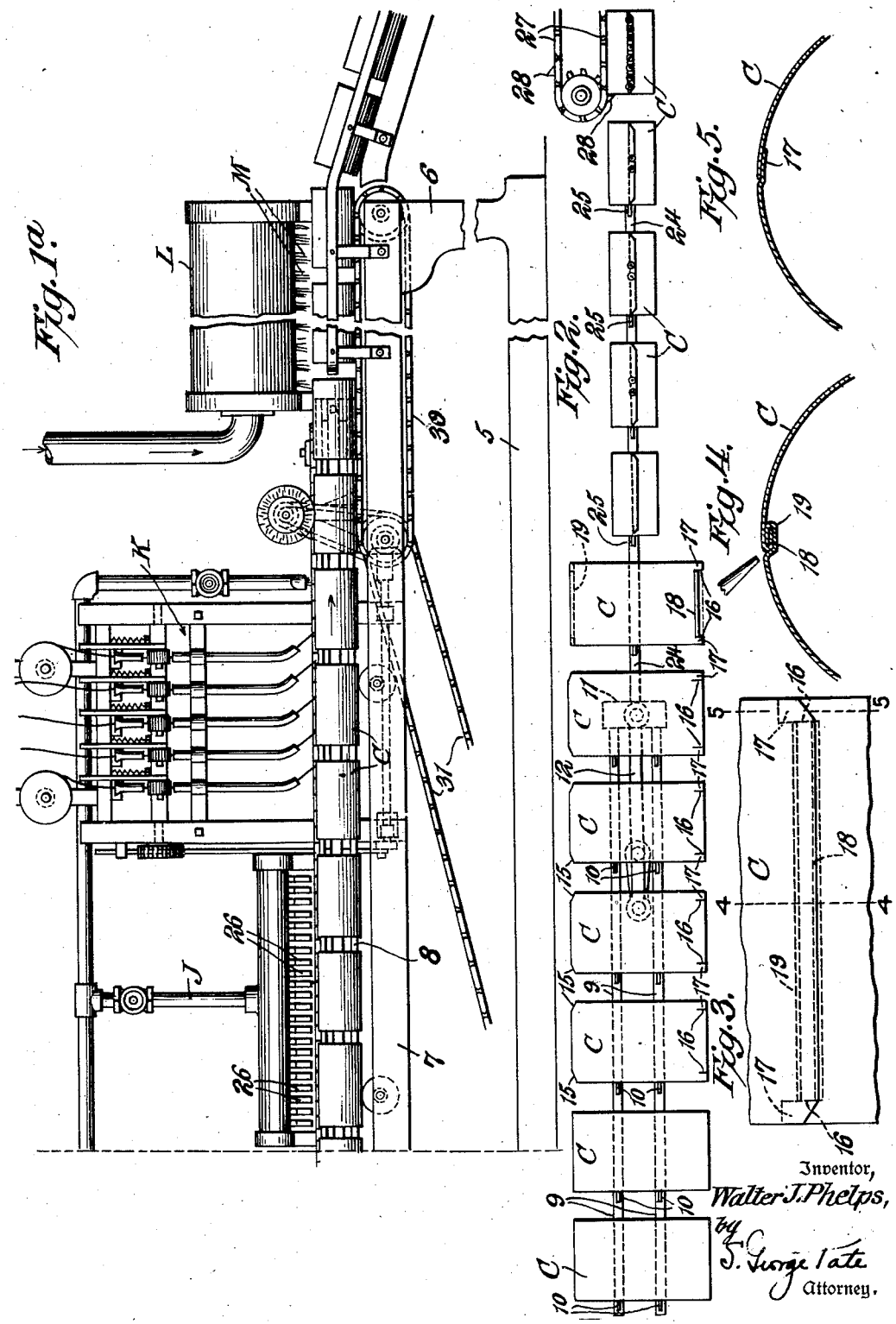

1,918,661

UNITED STATES PATENT OFFICE

WALTER J. PHELPS, OF BALTIMORE, MARYLAND, ASSIGNOR TO PHELPS CAN COMPANY, OF BALTIMORE, MARYLAND, A CORPORATION OF WEST VIRGINIA

METHOD AND MACHINE FOR SIDE SEAMING CAN BODIES

Application filed October 31, 1931. Serial No. 572,404.

This invention relates to new and useful improvements in methods and machines for side seaming can bodies, and more particularly in the method and machine for soldering the side seam of the "lock and lap" type.

The side seam of a can body includes a central double lock portion and end lapped portions. The lock extends throughout the length of the body except for the relatively short end lapped portions, and embodies four thicknesses of sheet metal whereas the lapped portions each embody but two thicknesses of sheet metal. In order to reduce the ends of the side seams to the two thicknesses, it is the practice to cut off the corners at one end of the blank, and at the other end of the blank to slit the corners longitudinally to form resultant tongues which together with the single thickness of the can body form overlapping seam ends of but two thicknesses each.

The soldering of said "lock and lap" can body side seams has heretofore been very difficult and much loss has been caused by the reason that the lap parts of the seam at each end of the can body are of only two thicknesses of tinplate which heats very quickly as compared to the lock part of the seam, the lock part being of four thicknesses of tinplate, and two thicknesses out of the four thicknesses comprising the lock part of the seam are hidden or covered by the two outside thicknesses of the lock seam so that the two inner thicknesses of the lock seam can only be heated by indirect heat.

The practice heretofore in soldering lock and lap seams, has been to apply the same amount of heat to all parts of the seam, and in so doing the necessary amount of heat required to properly solder the lock or four thickness part of the seam, resulted in seriously overheating the lap or two thickness part of the seam, and said overheating of the lap parts of seams has caused great trouble and loss through dissipating or burning away the flux from within the laps and oxidizing the tin surfaces before proper soldering could occur, thus causing imperfect soldering and leaks, and also said overheating of the laps often causes warping of the laps later causing imperfect joints and leaks after the can ends are double seamed onto the can bodies.

The principal object of my invention is therefore to provide a method for eliminating the above described objections and to provide a can side-seaming machine for carrying out the steps of my method in which means are provided for applying the proper amount of heat to the double interlock fold and a proper although lesser amount of heat to the end lap seams.

With the above and other objects in view which will more fully appear, the nature of the invention will be more clearly understood by following the description, the appended claims, and the several views illustrated in the accompanying drawings.

In the drawings:—

Figure 1 is a front elevation of the left hand end of a can side seaming machine embodying my invention, Figure 1a is a continuation thereof showing the right hand end of the machine in elevation, Figure 2 is a diagrammatic plan view illustrating the successive steps employed in carrying out my invention, Figure 3 is a fragmentary plan view of a can side seam, Figure 4 is a sectional view taken on the line 4—4 of Figure 3, Figure 5 is a sectional view taken on the line 5—5 of Figure 3, and Figure 6 is a detail sectional view of one of the pusher bars and spring dogs.

Like reference numerals designate corresponding parts throughout the several figures of the drawings.

Referring to the accompanying drawings, the can side-seaming machine which embodies my invention, includes a support or framework A comprising a base 5, standards 6, and a table 7.

Supported on the table 7 adjacent the left hand end thereof is a hopper B which contains a plurality of superposed can body blanks C. Centrally mounted upon the table 7 and extending longitudinally thereof is a soldering horn 8 of the usual construction, the left hand end thereof being disposed in spaced relation to the hopper B. Slidably mounted on the left hand end of the table 7 is a pair of spaced and longitudinally extending pusher bars 9, 9, each including upwardly spring pressed blank feeding dogs 10. The left hand ends of the pusher bars 9 are disposed under the hopper B in the usual manner and these bars are moved longitudinally of the table through the medium of a cross head 11 which connects the right hand ends of the pusher bars, and a driving connection, indicated as a whole by the numeral 12, between the crosshead 11 and a main shaft 13 which is journaled in the support A. By means of the pusher bars 9, the blanks C are successively withdrawn from the stack of blanks within the hopper B and are intermittently moved along the table toward the soldering horn 8 by means of the spring dogs 10.

The blanks during their passage from the hopper B to the soldering horn 8 are intermittently fed past a cutting mechanism D which is operated from the main shaft 13 through the medium of driving connections indicated as a whole by the reference numeral 14. The cutting mechanism D embodies a construction now in general use, and functions to cut off the corners at one end of the blank as indicated at 15 and form longitudinally extending notches or slits 16, 16 in the other end of the blank, the notches forming resultant tongues 17, 17.

Supported on the table 7 and located between the cutting mechanism D and the soldering horn 8 is a fluxing means E which is disposed in cooperative relation with the opposite ends of the blanks as they are intermittently fed thereunder. Supported on the table 7 between the fluxing means E and the soldering horn 8 is an edging mechanism F which bends the side portions of each blank into upwardly and downwardly extending flanges 18 and 19 respectively, the flange 18 extending between the tongues 17, 17 and the flange 19 extending between the beveled corners 15, 15. The flange mechanism F is of the usual construction and is operated from the main shaft 13 through connections which are indicated as a whole by the reference numeral 20.

Supported on the table 7 at the right of the flanging mechanism F and in registry with the left hand end of the soldering horn 8 is a forming mechanism G which functions to envelop the blank C around the soldering horn 8 and bend the flanges 18, 19 into a double interlock fold, the fold or seam being disposed at the top of the horn 8. Thus the double interlocked seam fold is formed by four thicknesses of sheet metal. The forming mechanism G also functions to position the tongues 17, 17 in overlapping relation with the can body beyond the ends of the interfold. Thus the seam includes a centrally located lock or fold portion consisting of four thicknesses of sheet metal which extend throughout the length of the can body except for the extreme ends thereof where the relatively short lap seams are located, the lap seams embodying the two thicknesses of sheet metal. The forming mechanism G is operated from the flanging mechanism F in the usual manner.

Disposed above the left hand end of the horn 8 immediately to the right of the forming mechanism G is a primary heating means H which includes three downwardly extending burners 21, 22 and 23.

These burners are disposed directly above the horn 8 and are spaced apart sufficient distances to direct the heat centrally against the central lock portions of three adjacent can bodies C, the heat from each burner being of sufficient intensity to properly heat the four thicknesses of the lock portion of each side seam. By reason of these burners directing their heat against the central portions of the side seam, it will be readily apparent that there will be no heat directly applied to the lapped end portions of the side seam. These can bodies are intermittently moved from the forming mechanism G to positions under the primary burners through the medium of a push rod 24 which is disposed at the right of the cross-head 11 and is connected thereto, said push rod 24 being provided with a plurality of spring pressed dogs 25 for engaging the can bodies.

Supported on the table 7 and located between the forming mechanism G and the primary heating means H is a fluxing means I which is disposed in proper cooperative relation relative to the side seams of the can bodies as they pass thereunder whereby said seams will be properly fluxed prior to the application of heat from the heating means H.

Disposed above the solding horn 8 and located immediately at the right of the primary heating means H is a secondary heating means J. This secondary heating means J includes a plurality of burners 26 which are arranged in longitudinal series for directing a considerably lesser amount of heat than that which is issued from the primary burner H, against the entire side seam of the can body. I preferably employ a sufficient number of these burners 26 to take care of a plurality of can bodies simultaneously. The can bodies are continuously fed along the horn 8 from the primary heating means H to the secondary heating means J through the medium of an endless chain 27 having feed dogs 28 fixed thereon, the chain being driven from the main shaft 13 by a driving connection indicated as a whole by the numeral 29. The heat from the secondary burners 26 is sufficient to properly heat the lap seam portions at the ends of the side seams, and at the same time maintain the previously heated central portion or lock portion in a sufficiently heated condition.

The can bodies after being thus heated are continuously fed along the horn 8 by the chain 27 to a position under a soldering means K which is supported on the table 7 and which functions to apply solder to the side seam of the can body throughout its entire length. The soldering means K may be of any desired construction providing it will apply the solder by gravity to the side seams of the can bodies.

After the soldering operation, the can bodies are fed from the right hand end of the soldering horn 8 by the chain 27 and are fed under a cooling means L of any suitable construction, such as an electric blast or the like, by means of a chain 30 which is driven from the driving connection 29 by a chain 31. I preferably associate a plurality of cleaning brushes M with the cooling means for smoothing the solder as well as removing any surplusage thereof.

From the foregoing, it will be seen that by my method the can body after having the side seam formed therein, is first intermittently fed past the primary heating means H where during the intermittent periods of st the central lock portion of each seam will be subjected to heat of sufficient intensity to properly heat all four thicknesses of the metal forming the lock portion of the seam, and without the heat being directly applied to the end lapped portions of the seam; then the can body is continuously fed past the secondary heater J which directs a considerably lesser amount of heat to the entire seam including the end lapped portions, and finally the can body is continuously fed from the secondary heater J past the soldering means L and brush M where the entire seam is soldered, brushed and surplus solder removed.

It is of course to be understood that the details of structure and arrangements of parts may be variously changed and modified without departing from the spirit and scope of my invention.

I claim:—

1. In a can side-seaming machine, the combination with means for forming a can body including a side seam comprising a central lock portion and lapped end portions, of a primary means for applying heat to said central lock portion only, a secondary means for applying a lesser amount of heat to the lapped end portions, and means for soldering the seam immediately subsequent to the application of said heat thereto.

2. In a can side-seaming machine, the combination with means for forming a can body including a side seam comprising a central lock portion and lapped end portions, of a primary means for applying heat to said central lock portion only, a secondary heating means comprising a plurality of burners for applying a lesser amount of heat to the entire seam including both the central lock portion and the lapped end portions, and means for soldering the seam immediately subsequent to the application of said heat thereto.

3. In a can side-seaming machine, the combination with means for forming a can body including a side seam comprising a central lock portion and lapped end portions, of a primary means for applying heat to said central lock portion only, means for intermittently feeding the can bodies past the primary heating means, a secondary means for applying a lesser amount of heat to the lapped end portions, and means for soldering the seam immediately subsequent to the application of said heat thereto.

4. In a can side-seaming machine, the combination with means for forming a can body including a side seam comprising a central lock portion and lapped end portions, of a primary means for applying heat to said central lock portion, a secondary means for applying a lesser amount of heat to the lapped end portions, means for continuously feeding the can bodies from the primary heating means past the secondary heating means, and means for soldering the seam immediately subsequent to the application of said heat thereto.

5. In a can side-seaming machine, the combination with means for forming a can body including a side seam comprising a central lock portion and lapped end portions, of a primary means for applying heat to said central lock portion, means for intermittently feeding the can bodies past the primary heating means, a secondary means for applying a lesser amount of heat to the lapped end portions, means for continuously feeding the can bodies from the primary heating means past the secondary heating means, and means for soldering the seam immediately subsequent to the application of said heat thereto.

6. In a can side-seaming machine, the combination with means for forming a can body including a side seam comprising a central lock portion and lapped end portions, of a primary means for applying heat to said central lock portion, a secondary heating means comprising a plurality of burners for applying a lesser amount of heat to the entire seam including both the central lock portion and the lapped end portions, means for continuously feeding the can bodies from the primary heating means past the secondary heating means, and means for soldering the seam immediately subsequent to the application of said heat thereto.

7. In a can side-seaming machine, the combination with means including a horn for forming a can body including a side seam comprising a central lock portion and lapped end portions, of a primary means disposed above the horn for applying heat to said central lock portion only, a secondary means disposed above the horn and located on the side of the primary heating means opposite the seam forming means for applying a lesser amount of heat to the lapped end portions, and means for soldering the seam immediately subsequent to the application of said heat thereto.

8. In a can side-seaming machine, the combination with means including a horn for forming a can body including a side seam comprising a central lock portion and lapped end portions, of a primary means disposed above the horn for applying heat to said central lock portion only, a secondary means disposed above the horn and located on the side of the primary heating means opposite the seam forming means for applying a lesser amount of heat to the lapped end portions, a soldering means disposed above the horn and located on the side of the secondary heating means opposite the primary heating means, and means for feeding the can bodies successively past the primary heating means, the secondary heating means, and the soldering means.

9. In a can side-seaming machine, the combination with means including a horn for forming a can body including a side seam comprising a central lock portion and lapped end portions, of a primary means disposed above the horn for applying heat to said central lock portion, a secondary means disposed above the horn and located on the side of the primary heating means opposite the seam forming means for applying a lesser amount of heat to the lapped end portions, a soldering means disposed above the horn and located on the side of the secondary heating means opposite the primary heating means, means for intermittently feeding the can bodies past the primary heating means, and means for continuously feeding the can bodies from the primary heating means past the secondary heating means to the soldering means.

10. The method of forming side seaming can bodies consisting in first forming a can body including a side seam comprising a central lock portion and lapped end portions, then applying heat to the central lock portion, then applying a lesser amount of heat to said lapped end portions, and finally soldering the seam throughout its length.

11. The method of forming side seaming can bodies consisting in first forming a can body including a side seam comprising a central lock portion and lapped end portions, then intermittently feeding the can body past a primary heating means whereby the central lock portion only of the seam will be heated while the can body is stationary, then continuously feeding the can body past a secondary heating means for directing a lesser amount of heat to the lapped end portions, and finally soldering the seam throughout its length.

WALTER J. PHELPS.